March 20, 1934.  J. O. GOODWIN  1,951,974
TIRE VULCANIZING MOLD
Filed Dec. 16, 1931   3 Sheets-Sheet 1

INVENTOR
John O Goodwin
BY
Norman Kennedy Campbell
ATTORNEYS

March 20, 1934. J. O. GOODWIN 1,951,974
TIRE VULCANIZING MOLD
Filed Dec. 16, 1931 3 Sheets-Sheet 2
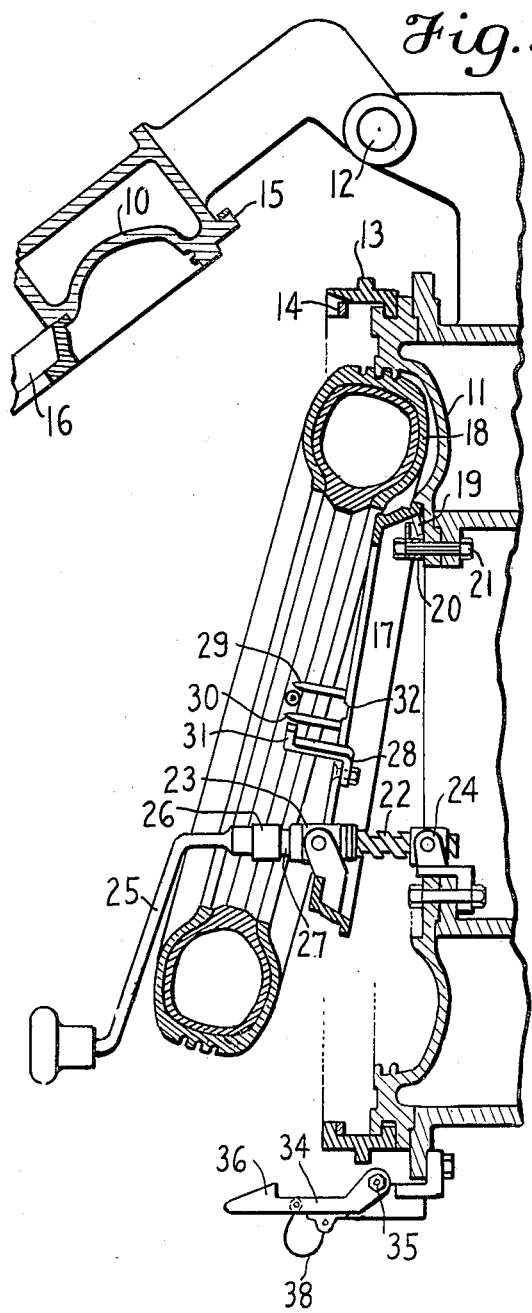
INVENTOR
John O Goodwin
BY
ATTORNEYS

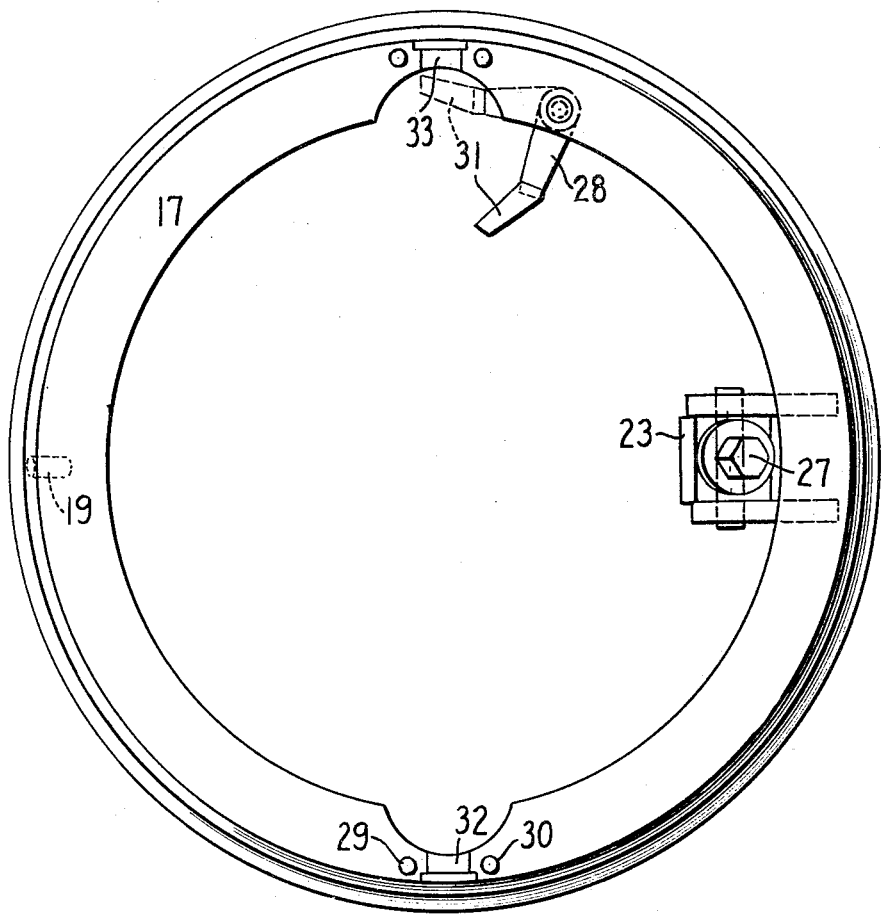

Patented Mar. 20, 1934

1,951,974

UNITED STATES PATENT OFFICE 1,951,974

TIRE VULCANIZING MOLD

John O. Goodwin, Akron, Ohio, assignor to Seiberling Rubber Company, a corporation of Delaware Application December 16, 1931, Serial No. 581,296

19 Claims. (Cl. 18—38)

This invention relates to apparatus for vulcanizing and molding pneumatic tires, inflatable tubes and like articles, of the type wherein heated complementary mold sections are supported in separable relation to permit the insertion and withdrawal of the article. It is particularly adapted to use in connection with a vulcanizer such as the "watchcase mold" and like devices in which the complementary mold sections are hinged relative to each other to permit opening and closing with a minimum of supporting structure.

Vulcanizers of the character described, particularly those adapted to the curing of pneumatic tires, are usually designed to include a pair of so-called "curing rings" which, when an article is in the vulcanizer, adjoin the respective mold sections to form therewith the molding surface. According to present general practice such rings are first applied to an article and clipped, or rimmed, together, after which such assembly is introduced into the mold. Among the objections to such procedure may be mentioned the rimming operation which requires costly presses, the danger of injury to an article during such operation, and the necessity of transporting the article with the heavy rings associated therewith to the vulcanizer with ensuing likelihood of injury to the article or rings during the course thereof.

The primary object of the present invention consists in providing an arrangement by which the curing rings are permanently mounted in the vulcanizer. Among the advantages inherent in such a construction may be mentioned the automatic rimming of the article under closing of the mold with less likelihood of injury than where rings are rimmed outside the mold, the maintenance of the curing rings at substantially the same temperature as the mold sections which results in uniform cure of the various parts of an article, and the provision of efficient means for insuring proper registry of the article with the rings and mold sections prior to the closing thereof.

As an important feature of the present construction it is proposed to mount the curing rings in the vulcanizer in such manner as will facilitate the insertion and withdrawal of the article from the mold sections. In the preferred embodiment of the invention the several curing rings are supported so as to be capable of remaining in fixed relation with the respective mold sections during the opening and closing thereof. However, in view of the tendency of an article to stick to the mold after curing, it is further proposed to mount at least one of the curing rings so as to be separable from its complementary mold section, actuating means being provided to effect such separation and cause the ring to pull the article out of the mold.

Particular difficulty is encountered in removing articles such as pneumatic tires from a vulcanizer for which an irregular molding surface must be provided to produce a desired configuration of the article, since such surfaces tend to materially increase the tendency of the article to resist withdrawal from the mold and consequently the force required to remove the same.

In order that the curing ring may be separated from the mold section to break the tire therefrom the ring is mounted to swing away from the mold. A suitable hinge connection is provided for this purpose, and the same acts as a fulcrum so that a minimum of force will be required to separate the ring from the mold. It readily will be appreciated that such arrangement offers many advantages over a construction in which the ring is mounted to be moved directly away from the complementary mold section. In the latter case the resistance of the article to withdrawal can be overcome only by the expenditure of considerably more power than is required where the mold section and ring are mounted in hinged relation.

The arrangement of the curing rings in association with the mold sections enables automatic rimming up by the mere closing of the mold. On the other hand, such operation tends to increase the difficulty in closing the vulcanizer since the article does not fully seat in the mold sections until the same have been brought completely together. Locking means, such as those of the sliding ring and lug type, ordinarily do not become operative until the mold sections are almost completely closed.

To overcome a tendency of the mold sections to bounce apart under resistance of the article to closure, it is a further object of this invention to provide means for effecting an initial engagement between the mold sections in a position such that the locking means will be rendered operative, such feature being particularly useful in connection with vulcanizers in which the mold sections are mounted in hinged relation.

A further important feature of this invention is the provision of retaining means which maintain the article to be vulcanized in position on one of the curing rings during the closing of the mold sections with the object of preventing the expenditure of unnecessary labor and prevent injury to the article by insuring proper registry thereof with the mold sections.

The above and further objects and advantages will appear from the following detailed description and the accompanying illustrative drawings in which:

Figs. 2 and 3 are views similar to Fig. 1 showing, respectively, the mold sections in fully closed and fully open positions, Fig. 3 also illustrating the manner in which a tire is broken away from one of the mold sections;

Fig. 4 is an enlarged view of a part of Fig. 1;

Fig. 5 is a fragmentary enlarged view of a part of Fig. 1, the part illustrated being cooperative with the portion of the apparatus shown in Fig. 4;

Fig. 6 is a fragmentary view in perspective of a portion of the structure of Fig. 4;

Fig. 7 is a plan view of the structure of Fig. 4.

Figure 1:
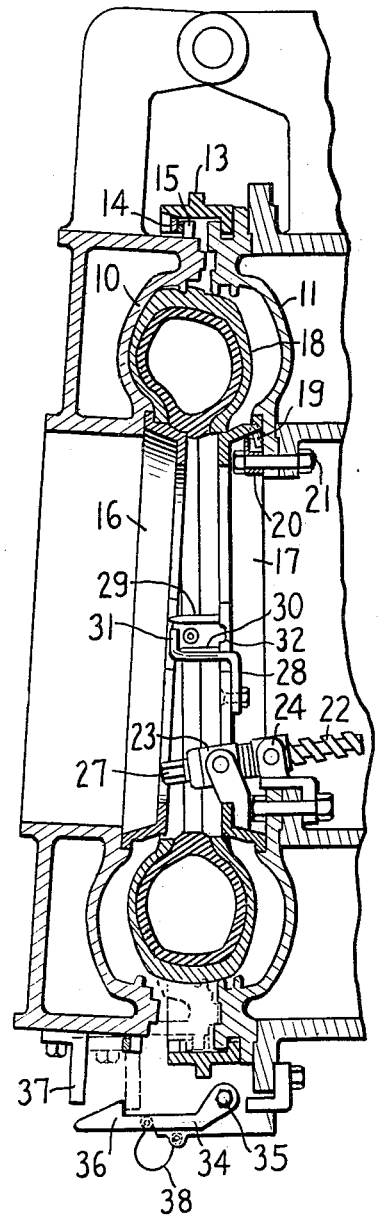
Fig. 1 is a sectional elevation of one part of a watchcase vulcanizer according to one embodiment of my invention, the mold sections being shown in partially closed position.

The apparatus illustrated in the drawings and now to be described is adapted to curing pneumatic tire casings. Such type of vulcanizer has been selected by reason of the fact that my invention is particularly useful in connection therewith. It will be understood, however, that my invention is capable of embodiment with equal advantage in vulcanizers adapted to cure other articles and to molds having a somewhat different structural arrangement of parts.

Figure 2:
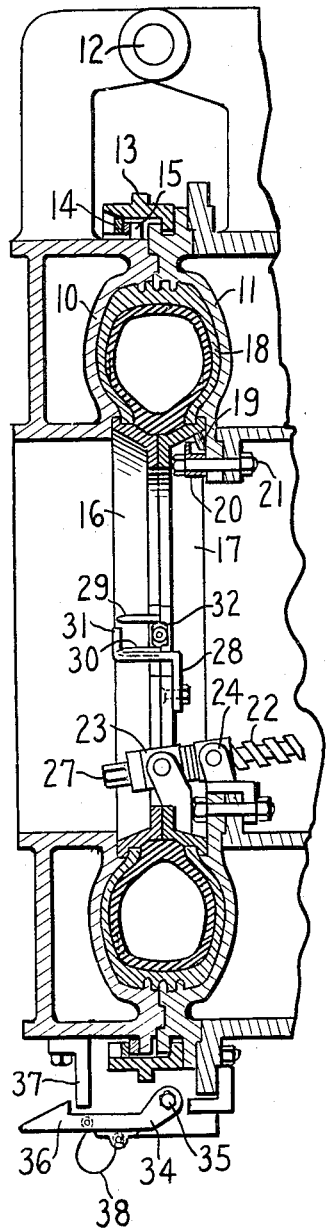

The conventional portion of the apparatus illustrated in Figs. 1–3 comprises a pair of separable annular mold sections 10 and 11 including suitable heating chambers and defining generally a mold cavity for the reception of a pneumatic tire. It will be assumed that the mold part 10 is movable, and that part 11 is stationary and mounted on some suitable support not shown. To facilitate separation, the movable mold section is hinged at 12 in relation to the fixed section so as to be capable of swinging movement relative thereto. A locking means comprising a rotating ring 13 associated with one of the mold sections and having locking parts 14 engageable with lugs 15 on the other mold sections is provided to secure the mold sections together, the same being operated by rotating the ring in opposite directions.

To complete the mold, curing rings 16 and 17 are provided to lie in complementary relation with the respective mold sections 10 and 11. Ordinarily such rings are removably associated with the mold sections and are clipped together and inserted in the apparatus with the article 18 which is to be cured.

According to the present invention, the curing rings 16 and 17 are made a permanent part of the vulcanizer so that they will remain in association with the mold sections and be rimmed on to the article 18 as the mold sections are closed, as shown in Fig. 1. One of the rings may be mounted in fixed relation to its complementary mold section as by bolting or other suitable expedient. To facilitate removal of the article from the mold after curing it is preferable that at least one of the curing rings be mounted in the vulcanizer so as to be movable with respect to its complementary mold section, it being calculated to utilize such ring to break the article away from the mold. If desired both rings may be so associated with the mold sections.

In the embodiment illustrated the ring 16 is permanently associated with swinging mold section 10, and the ring 17 is mounted with respect to the fixed section 11 so as to permit separation of the two. Of course the parts may be arranged in reverse relation.

With reference to the mounting of a ring section so as to be separable from its complementary mold section it may be pointed out that the ring may be supported to move directly away in such manner that its face will at all times lie in a plane parallel with that of the mold section. The disadvantage of such arrangement is that undue force will be required to separate the ring and pull the article from the mold section, this being particularly true where an irregular molding surface such as a tread ring is used to produce a configuration on the article. I therefore prefer to mount the curing ring 17 in such manner that it will hinge with reference to the complementary mold section 11, as in such way the ring may serve to break the article from the mold under a minimum of force.

While various means may be resorted to in providing a swinging mounting for the movable curing ring 17, I have found it desirable to provide a pivotal support for the ring on a part of the vulcanizer so that the ring will hinge relative to the mold section 11. A loose hinge connection is desirable to insure proper registry of the ring and mold when in closed relation. To this end I utilize a pin and socket connection, one part of which is associated with the curing ring, the complementary part being secured at a convenient point on the vulcanizer. A particularly desirable arrangement consists in hinging the ring directly on the mold section 11. Such construction is illustrated in the drawings, particular reference being had to Figs. 4–6. Preferably a pin 19 is provided to extend outwardly from the periphery of the ring so as to permit the latter to swing freely away from the mold section, and a recessed member 20 providing a comfortable socket for the pin is associated with the mold section as by means of one of the mold bolts 21.

To separate the swinging ring 17 from the mold section, suitable actuating means is provided which may conveniently comprise a steep-pitched screw 22 riding in trunnions 23 and 24, the latter, respectively, being pivotally supported in association with the curing ring 17 and the mold section 11 by any suitable securing means. A removable crank 25 is provided to actuate the screw 24, the same having a socket 26 engageable with a head 27 on the end of the screw, such arrangement being desirable so that the crank may be withdrawn and thus avoid interference with the opening and closing of the mold sections. For most effective operation, the actuating screw 22 and its supporting structure are located diametrically opposite the hinge connection between the ring and mold section.

The curing ring 17 will be maintained in closed relation with its complementary mold section 11 during the insertion of a tire as shown in Fig. 1. The closing of the mold will cause article 18 to be rimmed on to the rings 16 and 17 so as to be held in proper registry with the mold sections and thus prevent injury as the mold is brought to completely closed position and the ring 13 rotated to lock the mold sections.

Suitable securing means are provided to maintain an article in position with respect to one of the mold sections prior to the closing of the mold. In a tire vulcanizer such as illustrated, the securing means may be such as will engage the valve stem of the airbag with which the tire is provided. A specific arrangement of such character may comprise an arm 28 pivotally supported on the curing ring 17 and cooperative with valve receiving pins 29 and 30 thereon, the arm having a portion 31 adapted to extend across the pins to maintain the valve stem in place and hence hold the tire on the ring. Such arrangement also facilitates the connection of the airbag with a source of fluid.

In order that the valve stem of the airbag shall not interfere with the closing of the mold, suitable recesses 32 are provided in the respective rings. If a two-valve airbag is to be utilized, a second set of recesses 33 is also provided at a suitable point in the two rings.

Since the tire offers resistance to closure of the mold parts and is likely to cause a rebound of the mold section 10 as it is swung closed, by reason of the fact that the tire must be rimmed on to the curing rings in the course of the closing operation, it is desirable to provide an initial engaging means to prevent rebound and hold the mold sections in such position that the locking ring 13 can be rotated to bring the sections into fully closed and locked relation. A convenient arrangement of this character includes an arm 34 pivotally supported at 35 on one mold section and having a catch 36 engageable with a projection 37 secured to the other mold section. A spring 38 serves to hold the arm in engaging position but permits the arm to be withdrawn when desired. The projection 37 is positioned so as to engage the latch before the mold sections are fully closed, it being intended that such arrangement merely hold the mold sections sufficiently closed to enable the locking ring to become operative. Such features will be understood from a comparison of Figs. 1 and 2.

After curing has been completed and the article is to be removed, the movable mold section 10 is swung open, means being provided if desired to break the mold. The tire is then left in association with the mold section 11 and curing ring 17. The screw 22 is rotated by the crank 25 to cause the ring to swing away from the mold section as shown in Fig. 3, thus breaking the tire away therefrom and permitting its removal, the airbag valve retaining arm 28 being swung open for this purpose. After removal of the tire the screw is actuated to return the ring 17 to closed position with the mold section 11 and the apparatus is again ready for use. If any difficulty should be encountered in removing the tire from the ring 17 after the latter has been swung away from the mold section, this difficulty may be readily overcome by placing a spacing member (such as a block of wood) between the tire and the mold section and the ring then backed off from the tire by the rotation of the screw 22.

Various modifications of the several parts of the apparatus described can readily be made by those skilled in the art without departing from the spirit of this invention. It is therefore to be understood that the embodiment herein considered and, more particularly, the details thereof are not to be taken as limiting the invention further than may be required by the accompanying claims.

What is claimed is:

1. A vulcanizing mold including an annular mold member and a ring forming part of the mold associated with the mold member, the ring having a hinge support permitting swinging movement of the ring away from the mold member.

2. A vulcanizing mold including an annular mold member and a ring forming part of the mold associated with the mold member and being separable therefrom, the ring having a hinged support permitting swinging movement of the ring relative to the mold member, and actuating means engageable with the ring to cause separation thereof from the mold member.

3. A vulcanizing mold including an annular mold member for one face of a tire, and a bead ring associated with the mold member but being separable therefrom to cause withdrawal of the tire from the mold member, said bead ring having a hinge support permitting swinging movement thereof relative to the mold member.

4. A vulcanizing mold including separable annular sections, a ring forming part of the mold associated with one of the mold sections and being separable therefrom, the ring having a hinge support permitting swinging movement thereof relative to the mold action.

5. A vulcanizing mold including separable annular mold sections, a ring forming part of the mold associated with one of the mold sections and being separable therefrom, and a hinge support for the ring permitting swinging movement thereof relative to the mold section.

6. A vulcanizing mold including separable annular mold sections, a ring forming part of the mold associated with one of the mold sections and being separable therefrom, the ring being hingedly supported by the mold section so as to permit swinging movement of the ring relative thereto.

7. A vulcanizing mold including separable annular mold sections, a ring forming part of the mold associated with one of the mold sections and being separable therefrom, and a pin and socket connection between the ring and mold section constituting a loose hinge therebetween, said connection permitting free swinging movement of the ring with respect to the mold section.

8. A vulcanizing mold including separable annular mold sections, a ring forming part of the mold associated with one of the mold sections and being separable therefrom, the ring having a hinge support permitting swinging movement relative to the mold section, and actuating means adapted to engage the ring and cause separation thereof from the mold section.

9. A vulcanizing mold including separable annular mold sections, a ring forming part of the mold associated with one of the mold sections and being separable therefrom, the ring having a hinge support permitting swinging movement relative to the mold section, and screw actuating means engageable with the ring to cause separation thereof from the mold section.

10. A vulcanizing mold including separable mold sections, a ring forming part of the mold associated with one of the mold sections and being separable therefrom, the ring having a single hinged support permitting swinging movement relative to the mold section, and actuating means engageable with a portion of the ring opposite the point of support to cause swinging movement of the ring away from the mold section.

11. A vulcanizing mold including separable mold sections, rings forming part of the mold associated with the respective mold sections, one of the rings being mounted in fixed relation with its complementary mold section for movement therewith, the other ring being mounted for 12. A vulcanizing mold including separable mold sections, rings forming part of the mold associated with the respective mold sections, one of the rings being mounted in fixed relation with its complementary mold section for movement therewith, the other ring having a hinge support permitting swinging movement thereof relative to the other mold section.

13. A vulcanizing mold including separable mold sections adapted to receive a tire assembly, bead rings forming part of the mold associated with the respective mold sections, and means engageable with the valve of the tire assembly adapted to maintain the same in position relative to one of the rings during closing of the mold sections.

14. A vulcanizing mold including separable mold sections adapted to receive a tire, bead rings forming part of the mold associated with the respective mold sections and means on one of the rings engageable with the valve of the tire to maintain the same in position on said ring during closing of the mold sections.

15. A vulcanizing mold including separable mold sections adapted to receive a tire containing a valved airbag, rings forming part of the mold associated with the respective mold sections, and means on one of the rings engageable with the valve stem of the airbag for maintaining the tire in position on said ring during closing of the mold sections.

16. A vulcanizing mold including a fixed mold section and a swinging mold section, and a fixed ring and a swinging ring, said rings forming part of the mold and being respectively associated one ring with one mold section and the second ring with the other mold section.

17. A vulcanizing mold including a fixed mold section and a swinging mold section, and rings forming part of the mold associated with the respective mold sections, the ring associated with the fixed mold section having a hinge support permitting swinging movement of the ring to cause separation thereof from said mold section, and means engageable with the ring to cause separation thereof relative to the mold section.

18. A vulcanizing mold including separable annular mold sections, a ring forming part of the mold associated with one of the mold sections and being separable therefrom, the ring being hingedly supported by the mold section so as to permit swinging movement of the ring relative thereto, and a screw device for effecting such swinging movement of the ring, said screw device being pivoted to the ring and the mold section to accommodate itself to the different positions of the ring.

19. A vulcanizing mold including separable annular mold sections, a ring forming part of the mold associated with one of the mold sections and being separable therefrom, the ring being hingedly supported by the mold section so as to permit swinging movement of the ring relative thereto, a screw device pivoted to the mold section and the hinged ring respectively for effecting the swinging movement of the ring, and a detachable hand crank adapted to be engaged with the screw device for actuating the same.

JOHN O. GOODWIN.